Patented June 11, 1935

2,004,875

UNITED STATES PATENT OFFICE 2,004,875

MANUFACTURE OF ARTIFICIAL MATERIALS

Leon Lilienfeld, Vienna, Austria

No Drawing. Application June 27, 1930, Serial No. 464,426. In Austria July 15, 1929

5 Claims. (Cl. 18—54)

This invention is an improvement in the treatment of products of the kind produced in accordance with the process described in my U. S. patent application Ser. No. 435,649.

In said application is described a process of making artificial materials, for example artificial silk, by acting with a halogen derivative, particularly a halohydrin of a di- or poly-hydroxylic alcohol, (e. g. alpha monochlorhydrin or alpha dichlorhydrin or ethylene bromhydrin) upon viscose, and thereafter forming the product of this step into an artificial material (e. g. thread) and treating the latter (either with or without preliminary coagulation by dilute acids, acid salts and the like) with a plasticizing bath such as sulphuric acid of at least 35%, optionally under some tension, and finally washing, drying and the like.

The products have good luster, high wet and dry tenacity, and a considerable degree of elasticity.

The process of the present case also applies to the treatment of products produced in my concurrent application 464,425, in which is disclosed and claimed a process similar to the above, but with the substitution of a halogen fatty acid in place of the halogen derivative of the polyhydroxy alcohol. Examples of several halogen fatty acids mentioned in said case are chloracetic and numerous others.

The process is also applicable to artificial materials (e. g. artificial silk) made by coagulating and plasticizing, by appropriate acid treatment, a solution of O-oxyalkyl cellulose xanthate prepared for example as in my copending application 435,648 filed March 13, 1930. As as example of such a process, (from said application) the following is given. Alkali cellulose is made from 1000 parts of cellulose, this treated with say 100 parts of α monochlorhydrine, then aged 21 hours at 20° C., washed until substantially free from alkali, converted into its alkali compound by impregnating with caustic alkali solution, pressing to 3000-4000 parts, and comminuting, thereafter treated with 600 parts $CS_2$ allowed to react for say 10 hours at 19° C., the excess of $CS_2$ blown off, and dissolved in water and NaOH to give a solution containing about 8% of NaOH. This solution can then be squirted through fine nozzles into sulphuric acid of 50 or 55% or stronger, whereby the streams are first coagulated and then plasticized, the threads then washed and finished like rayon silk.

The process of the present case is also applicable to the product of my concurrent application 464,427, which process differs from the process of the main application 435,649 in substituting one or more trithiocarbonic acid esters and in particular such esters of polyhydroxylic alcohols (e. g. glycol, glycerine, etc.) in place of the halohydrins of polyhydroxylic alcohols. Thus to 1400 parts of viscose containing 6.5% of parent cellulose and 5% of NaOH is added 30 parts of α-α'-ditrithiocarbonic acid glycerine ester, the mixture thoroughly stirred, filtered, and spun into a bath of sulphuric acid of at least 35% and preferably 50 to 70% strength. Threads produced according to the processes of these copending cases have a dry tenacity above 2 grams per denier, and an extensibility above 7% and other useful properties. Such products are claimed in my copending application 435,649 above referred to.

In the present case, the silk so formed can be treated according to the examples of the present process, given below, for the elimination of the said yellowish color and/or opalescence therefrom.

A characteristic feature of the artificial materials (e. g. threads or filaments) produced by the process of my said copending cases, is high extensibility and high elasticity, substantially exceeding the extensibility and elasticity of artificial materials made by processes of coagulating and plasticizing viscose in strong mineral acids, e. g. $H_2SO_4$ of 50 or 55% concentration, or more. Another characteristic difference of the products of said cases over products made by the usual old processes (but not the products of my U. S. Patents 1,683,199 and 1,683,200) is the high strength, far surpassing the strength of ordinary products made by the usual old processes.

Thus the threads or filaments show the valuable properties of dry tenacity exceeding 2 grams per denier and extensibility exceeding 7%. They also exhibit, in their crude state, an undesirable yellow coloration and sometimes an opalescence (the color and opalescence not being caused wholly by free sulphur therein) and which yellow color and/or opalescence, as above stated will not be wholly or even substantially wholly removed by treatment with alkali metal sulphides of the concentration ordinarily used in desulphurization and will not be wholly or even substantially removed by the bleaching processes commonly used for bleaching viscose silk.

The said yellow coloration and/or opalescence, not removable by ordinary desulphurizing baths, appears to be caused by the presence, in the products (threads, etc.) of complex sulphur-containing organic compounds, the exact chemical composition of which is not fully known with certainty, but these are removable by the process as herein described and claimed.

The valuable properties mentioned (high strength and high extensibility) are not lost when treating the materials by the process of the present case.

Some of the artificial materials, for instance artificial threads, obtained by the process described in the said copending cases, have a yellow or yellowish coloration and frequently also a slight opalescence which is not eliminated or is only in part eliminated by the usual after-treatment with a bleaching bath or a desulphurizing bath as commonly used in the viscose silk art. The yellow colour or the opalescence or both have in some cases a disadvantageous effect on the lustre of the artificial material or artificial thread produced. This yellow coloration (aside from the yellow caused by free sulphur readily removable by treatment with ordinary desulphurizing baths, such as Na2S solution of 1% strength or less), and the opalescence appears to be due to the presence of reaction by-products, formed during the reactions of treating the viscose with the added agents and the subsequent setting and plasticizing treatments.

According to the present invention, in the cases in question, the yellow colour and the opalescence (if the latter is also present) are caused to disappear and the artificial material or artificial threads are made lustrous and non-opalescent by treating the artificial material or artificial threads with a warm or hot alkali sulphide solution containing not less than 5 per cent. of alkali sulphide (calculated as Na2S+9H2O)

equivalent to about 1.62% actual Na2S, and advantageously not less than 10 per cent. of alkali sulphide (calculated as Na2S+9H2O). The term "heated" as used herein means warm, or hot or boiling.

Viscose silk and other artificial materials made by regeneration of cellulose from viscose, usually contain, in their crude state, a small amount of free sulphur. This is commonly removed by treatment with a dilute solution of sodium sulphide, such a solution containing up to about 1% of actual Na2S (equivalent to a little below 3% of Na2S+9H2O). Such solutions however as are commonly used for desulphurizing actions will not remove the yellow coloration and/or opalescence referred to above, the removal of which, in accordance with the present process requires solutions containing 5% or more of Na2S+9H2O.

The artificial material or artificial threads may be subjected to the process in the finished state and may enter said treatment in dry, moist or wet condition. If desired however, the process may take place in the operation of manufacturing the artificial material, that is to say the artificial material or artificial threads may be treated according to the invention on leaving the precipitating bath or the supplementary bath (if any) or the washing water, i. e. without the heretofore usual desulphurization process.

When sufficiently strong solutions of alkali sulphide are used, the decolorization is so complete that, if desired, a bleach prior or subsequent to the treatment according to the present process may be dispensed with. Such a bleach, however, if desired, can be applied before or after the treatment according to this invention.

The artificial materials or artificial threads may be subjected to the process of this invention in stretched or not stretched condition.

The process of the invention exerts no injurious effect on the strength of the artificial material or artificial threads. In many cases it rather enhances the tenacity.

The following examples illustrate the present invention, which, however, is not limited to these examples:

*Example 1.*—Artificial silk made as described in Examples I to XVI or XXIV to XXXII of my U. S. application Ser. No. 435,649 which, when treated with the generally usual desulphurizing baths—for example a sodium sulphide solution of 0.6 to 1 per cent. (calculated as Na2S+9H2O) strength at 100° C. or with a sodium sulphide solution of 2 per cent. (calculated as

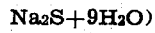

Na2S+9H2O)

strength at 100° C.—does not lose its yellowish colour or loses it only in part, is introduced in the form of skeins in unbleached and not desulphurized condition into a solution of crystallized sodium sulphide of 30 per cent. strength at 100° C. and after the lapse of some 2 minutes is withdrawn, rinsed for a short time with hot water, then washed with cold water and dried. If the sodium sulphide solution is only warm, instead of hot (100° C.) it will be understood that the process is slower, i. e. a longer time of immersion will be needed. If a more dilute solution is used, a longer time of contact should be given.

The artificial silk, which before the treatment is distinctly yellow or slightly opalescent, is rendered completely white (i. e. colorless) by the treatment, has increased in lustre and shows no opalescence.

*Example 2.*—The operation is as described in Example 1, but with the difference that, instead of the sodium sulphide solution of 30 per cent. strength, a solution of crystallized sodium sulphide of 58 per cent. strength is used.

In the two examples given, solutions of sodium sulphide crystals of respectively 30% and 58% concentration are mentioned. In carrying out this process, I prefer to use solutions of not substantially below 30%, as with such solutions not only are the desulphurization and the removal of yellow coloration and opalescence (other than that caused by free sulphur) very complete, but these effects are accomplished within a very short time, and usually the decolorization is sufficiently complete by the said treatment, that the heretofore usual bleaching operation can be dispensed with.

*Example 3.*—The operation is the same as in Example 1, but with the difference that, instead of the sodium sulphide solution of 30 per cent. strength, a solution of crystallized sodium sulphide of 20 per cent. strength is used.

*Example 4.*—The operation is the same as in Example 1, but with the difference that, instead of the solution of sodium sulphide of 30 per cent. strength, a solution of crystallized sodium sulphide of 10 per cent. strength is used and the duration of the heating at 100° C. is 1 hour.

*Example 5.*—The process is conducted as in Example 4, but with the difference that, instead of the sodium sulphide solution of 10 per cent. strength, a solution of crystallized sodium sulphide of 5 per cent. strength is employed.

*Example 6.*—The operation is the same as in any one of the preceding examples, but with the difference that the artificial silk, after it has been treated with the sodium sulphide solution and thoroughly rinsed with water, is soured with sulphuric acid of 10 per cent. strength at room temperature and then washed.

Example 7.—The operation is the same as in any one of the preceding examples, but with the difference that the artificial silk, before it is treated with sodium sulphide solution, is bleached and desulphurized in known manner.

Example 8.—The operation is the same as in any one of the preceding examples, with the difference that the treatment is applied to the artificial threads while they are in stretched condition.

The present process may also be applied to artificial materials, for example artificial silk produced according to my U. S. application Ser. No. 435,649, which from the very beginning or after bleaching and/or desulphurizing by means of the usual very dilute solution of sodium sulphide or by means of another desulphurizing bath or agent, are white or almost white. By the treatment according to the present process also such silk gains valuable properties. For this purpose said artificial silk, for example such as is produced according to Examples XVII to XXIII of said application, is treated as in any one of the preceding examples.

In the foregoing examples there can be used instead of sodium sulphide, another sulphide, for example an equivalent quantity of potassium sulphide or ammonium sulphide or sodium hydrosulphide or potassium hydrosulphide and such materials are included in the term "alkali sulphide" used hereinafter.

Films, dressings, coatings, plates or bands or the like, obtainable by the process of the aforesaid applications, so far as they have a yellowish or yellow-brownish colour, may be decolorized in the same manner as described in the foregoing examples for the treatment of artificial silk.

What I claim is:—

1. A process of removing yellowness and opalescence in artificial materials prepared from a solution of a xanthated product and containing free sulphur and also having a yellowness and opalescence not completely removable by desulphurization with solutions containing up to 3% of $Na_2S.9H_2O$, as heretofore applied to artificial silk, which process comprises subjecting such artificial materials to a treatment with a warm alkali sulphide solution of at least 5% strength, figured as $Na_2S.9H_2O$, until the said opalescence and yellowness are for the most part at least removed, and thereafter washing.

2. A process as in claim 1 in which the artificial material treated is a textile material.

3. A process of treating an artificial material of the herein described group consisting of (a) coagulated and plasticized artificial material from a reaction product of viscose with a halogen derivative of a polyhydroxylic alcohol, (b) coagulated and plasticized artificial material from a reaction product of viscose with a trithiocarbonic acid ester and (c) coagulated and plasticized artificial material from a solution of O-oxyalkyl cellulose xanthate, and (d) coagulated and plasticized artificial material from a reaction product of viscose with a halogen fatty acid, such artificial materials having initially a yellowish color and opalescence not wholly caused by elemental sulphur therein and not completely removable by desulphurization in a solution containing up to 3% of $Na_2S+9H_2O$, by the methods commonly applied to artificial silk, which process comprises treating such artificial material with a heated solution of an alkali metal sulphide of substantially over 5% strength, figured as $Na_2S+9H_2O$ until sufficiently purified.

4. A process of treating artificial material of the herein described group consisting of (a) coagulated and plasticized artificial material from a reaction product of viscose with a halogen derivative of a polyhydroxylic alcohol, (b) coagulated and plasticized artificial material from a reaction product of viscose with a trithiocarbonic acid ester, and (c) coagulated and plasticized artificial material from a solution of O-oxyalkyl cellulose xanthate and (d) coagulated and plasticized artificial material from a reaction product of viscose with a halogen fatty acid, such artificial materials having a yellowish color and opalescence not completely removable by desulphurization in a bath containing about 3% of $Na_2S+9H_2O$, which process comprises treating such artificial material with a hot solution of an alkali metal sulphide of a strength corresponding to at least a 5% solution of $Na_2S+9H_2O$ until sufficiently purified.

5. A process of removing yellowness and opalescence in artificial materials prepared from a solution of a xanthated product and containing free sulphur and also having a yellowness and opalescence not completely removable by desulphurization with solutions containing up to 3% of $Na_2S.9H_2O$, as heretofore applied to artificial silk, which process comprises subjecting such artificial materials to a treatment with a warm alkali sulphide solution of at least about 30% strength, figured as $Na_2S.9H_2O$, until the said opalescence and yellowness are substantially removed, and thereafter washing.

LEON LILIENFELD.